United States Patent
Iwai et al.

(10) Patent No.: US 11,011,312 B2
(45) Date of Patent: *May 18, 2021

(54) MULTILAYER CERAMIC CAPACITOR USING MOLYBDENUM (MO) GROUND LAYER AND MANUFACTURING METHOD OF THE SAME

(71) Applicant: TAIYO YUDEN CO., LTD., Tokyo (JP)

(72) Inventors: Daisuke Iwai, Takasaki (JP); Atsuhiro Yanagisawa, Takasaki (JP); Yoshinori Shibata, Takasaki (JP); Masumi Ishii, Takasaki (JP); Takeshi Nosaki, Takasaki (JP); Hiroyuki Moteki, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/434,003

(22) Filed: Jun. 6, 2019

(65) Prior Publication Data
US 2019/0378655 A1 Dec. 12, 2019

(30) Foreign Application Priority Data
Jun. 12, 2018 (JP) .............................. JP2018-112011

(51) Int. Cl.
*H01G 4/232* (2006.01)
*H01G 4/30* (2006.01)
(Continued)

(52) U.S. Cl.
CPC ......... *H01G 4/2325* (2013.01); *H01G 4/0085* (2013.01); *H01G 4/012* (2013.01);
(Continued)

(58) Field of Classification Search
None
See application file for complete search history.

(56) References Cited

U.S. PATENT DOCUMENTS 4,511,601 A 4/1985 Akse et al.
4,607,314 A * 8/1986 Wada .................. C04B 35/4682
361/321.4
(Continued)

FOREIGN PATENT DOCUMENTS

JP H0180011 A 3/1989
JP 2001015376 A 1/2001
(Continued)

OTHER PUBLICATIONS

Non-Final Office Action issued by U.S. Patent and Trademark Office, dated Jun. 15, 2018, for U.S. Appl. No. 15/836,657, now U.S. Pat. No. 10,290,424. (18 pages).
(Continued)

*Primary Examiner* — Binh B Tran
*Assistant Examiner* — Muhammed Azam
(74) *Attorney, Agent, or Firm* — Law Office of Katsuhiro Arai (57) ABSTRACT

A multilayer ceramic capacitor includes: a multilayer chip in which each of dielectric layers and each of internal electrode layers are alternately stacked and the internal electrode layers are alternately exposed to two end faces; and external electrodes formed on the two end faces; wherein: the external electrodes have a structure in which a plated layer is formed on a ground layer including Mo; and "M≥0.003185× (Ew×Et)$^{-0.5921}$" is satisfied when "Et" is a height from a bottom one of the internal electrode layers to a top one of the internal electrode layers, "Ew" is a width of the internal electrode layers in a direction in which side faces of the multilayer chip face with each other, and "M" is a Mo concentration (atm %) with respect to a main component
(Continued)

ceramic of a total of the multilayer chip and the pair of external electrodes.

17 Claims, 7 Drawing Sheets

(51) Int. Cl.
  *H01G 4/248* (2006.01)
  *H01G 4/012* (2006.01)
  *H01G 4/008* (2006.01)
  *H01G 4/12* (2006.01)
(52) U.S. Cl.
  CPC .............. *H01G 4/248* (2013.01); *H01G 4/30* (2013.01); *H01G 4/1227* (2013.01)

(56) References Cited

U.S. PATENT DOCUMENTS

| | | | | |
|---|---|---|---|---|
| 4,610,968 | A * | 9/1986 | Wada | C04B 35/4682 361/320 |
| 5,036,424 | A * | 7/1991 | Yokotani | B32B 18/00 29/25.42 |
| 5,204,069 | A | 4/1993 | Paxton et al. | |
| 5,296,425 | A * | 3/1994 | Chazono | C04B 35/465 501/138 |
| 5,852,542 | A * | 12/1998 | Wada | H01G 4/1227 361/321.5 |
| 5,973,390 | A | 10/1999 | Amaya et al. | |
| 6,346,497 | B1 * | 2/2002 | Nakamura | C04B 35/4682 361/321.4 |
| 6,673,461 | B2 * | 1/2004 | Chazono | H01G 4/1227 428/469 |
| 7,446,997 | B2 * | 11/2008 | Kaneda | H01G 4/1227 361/306.1 |
| 7,710,712 | B2 * | 5/2010 | Takeoka | H01G 4/1227 361/321.2 |
| 7,821,770 | B2 * | 10/2010 | Nishikawa | C04B 35/4682 361/321.2 |
| 8,064,190 | B2 * | 11/2011 | Taniguchi | H01G 4/30 361/321.4 |
| 8,102,639 | B2 * | 1/2012 | Kasuya | H01G 4/1227 361/305 |
| 8,917,491 | B2 * | 12/2014 | Masuda | H01G 9/048 361/321.1 |
| 9,281,125 | B2 * | 3/2016 | Taniguchi | H01G 4/1218 |
| 9,502,181 | B2 * | 11/2016 | Suga | H01G 4/30 |
| 10,056,191 | B2 * | 8/2018 | Ryu | H01G 4/1227 |
| 10,056,192 | B2 * | 8/2018 | Taniguchi | H01G 4/1218 |
| 10,381,156 | B2 * | 8/2019 | Nishikawa | C04B 35/4682 |
| 10,431,383 | B2 * | 10/2019 | Morita | H01G 4/012 |
| 10,431,384 | B2 * | 10/2019 | Morita | H01G 4/2325 |
| 10,515,764 | B2 | 12/2019 | Mizuno et al. | |
| 10,672,558 | B2 * | 6/2020 | Morita | H01G 4/232 |
| 10,672,559 | B2 * | 6/2020 | Inomata | H01G 4/012 |
| 2002/0039272 | A1 | 4/2002 | Mizuno et al. | |
| 2004/0126484 | A1 * | 7/2004 | Croswell | H01G 4/12 427/79 |
| 2004/0144205 | A1 | 7/2004 | Matsuno et al. | |
| 2004/0145856 | A1 | 7/2004 | Nakamura et al. | |
| 2004/0176239 | A1 | 9/2004 | Nakamura et al. | |
| 2005/0254197 | A1 * | 11/2005 | Murosawa | H01G 4/30 361/321.2 |
| 2007/0213201 | A1 * | 9/2007 | Hara | H01G 4/1209 501/137 |
| 2009/0002920 | A1 * | 1/2009 | Itamura | H01G 4/2325 361/321.3 |
| 2009/0168299 | A1 * | 7/2009 | Thomas | H01G 9/0032 361/311 |
| 2009/0225494 | A1 * | 9/2009 | Yamazaki | C04B 35/4682 361/321.4 |
| 2009/0310279 | A1 * | 12/2009 | Sasabayashi | C04B 35/4682 361/321.4 |
| 2009/0323253 | A1 * | 12/2009 | Kobayashi | H01G 4/232 361/301.4 |
| 2011/0019333 | A1 * | 1/2011 | Yao | C04B 35/4682 361/301.4 |
| 2011/0235235 | A1 * | 9/2011 | Yao | C04B 35/4682 361/321.4 |
| 2012/0287553 | A1 * | 11/2012 | Ramani | H01G 4/33 361/301.4 |
| 2013/0020905 | A1 * | 1/2013 | Sawada | H01G 4/012 310/311 |
| 2013/0107419 | A1 * | 5/2013 | Hill | H01G 4/008 361/305 |
| 2013/0222968 | A1 * | 8/2013 | Koga | C04B 35/62818 361/301.4 |
| 2013/0299215 | A1 * | 11/2013 | Taseda | H01G 4/248 174/255 |
| 2014/0009864 | A1 | 1/2014 | Takashima et al. | |
| 2014/0029159 | A1 * | 1/2014 | Shimada | H01G 4/30 361/303 |
| 2015/0055273 | A1 * | 2/2015 | Endo | H01G 4/30 361/301.4 |
| 2015/0062775 | A1 * | 3/2015 | Shibasaki | H01G 4/012 361/301.4 |
| 2015/0287535 | A1 * | 10/2015 | Nakanishi | H01G 4/1245 361/301.4 |
| 2016/0042868 | A1 * | 2/2016 | Otsuka | H01G 4/30 361/301.4 |
| 2016/0086733 | A1 * | 3/2016 | Saito | H01G 4/1227 361/301.4 |
| 2016/0172109 | A1 * | 6/2016 | Kobayashi | H01G 4/012 361/301.4 |
| 2016/0189865 | A1 * | 6/2016 | Kawamura | H01G 4/1227 361/301.4 |
| 2016/0189867 | A1 * | 6/2016 | Zaima | H01G 4/232 361/301.4 |
| 2016/0189868 | A1 * | 6/2016 | Sasaki | H01G 4/012 361/301.4 |
| 2016/0217924 | A1 * | 7/2016 | Morita | C04B 35/4682 |
| 2016/0254094 | A1 * | 9/2016 | Lee | H01G 4/30 361/301.4 |
| 2016/0284471 | A1 * | 9/2016 | Mizuno | H01G 4/30 |
| 2017/0032894 | A1 * | 2/2017 | Kawamura | H01G 4/1227 |
| 2017/0032895 | A1 * | 2/2017 | Ogata | H01G 4/1227 |
| 2017/0032897 | A1 * | 2/2017 | Sasaki | H01G 4/0085 |
| 2017/0345564 | A1 * | 11/2017 | Ryu | H01G 4/005 |
| 2017/0345566 | A1 * | 11/2017 | Tanaka | H01G 4/1209 |
| 2017/0345570 | A1 * | 11/2017 | Sakatsume | H01G 4/2325 |
| 2017/0372841 | A1 * | 12/2017 | Kawamura | C04B 35/62685 |
| 2018/0061576 | A1 * | 3/2018 | Nakamura | H01G 4/248 |
| 2018/0068790 | A1 * | 3/2018 | Chigira | H01G 4/0085 |
| 2018/0068797 | A1 * | 3/2018 | Chigira | H01G 4/30 |
| 2018/0139826 | A1 * | 5/2018 | Cho | H01G 4/33 |
| 2018/0162780 | A1 * | 6/2018 | Kaneda | B32B 15/00 |
| 2018/0174752 | A1 * | 6/2018 | Yanagisawa | H01G 4/30 |
| 2018/0182552 | A1 * | 6/2018 | Sawada | H01G 4/12 |
| 2018/0233284 | A1 * | 8/2018 | Taniguchi | H01G 4/1227 |
| 2019/0027311 | A1 * | 1/2019 | Chigira | H01G 4/30 |
| 2019/0096577 | A1 * | 3/2019 | Uenishi | H01G 4/12 |
| 2019/0148070 | A1 * | 5/2019 | Kobayashi | H05K 1/111 174/260 |
| 2019/0237262 | A1 * | 8/2019 | Nagaoka | H01G 4/008 |
| 2019/0244758 | A1 * | 8/2019 | Oshima | H01G 4/1245 |
| 2019/0272954 | A1 * | 9/2019 | Ariga | H01G 4/008 |
| 2019/0355517 | A1 * | 11/2019 | Chigira | H01G 4/30 |
| 2019/0355520 | A1 * | 11/2019 | Nakamura | H01G 4/30 |
| 2019/0362895 | A1 * | 11/2019 | Kobayashi | H01G 4/2325 |
| 2019/0371525 | A1 * | 12/2019 | Zaima | H01G 4/012 |
| 2019/0371526 | A1 * | 12/2019 | Ubukata | H01G 4/232 |
| 2019/0378655 | A1 * | 12/2019 | Iwai | H01G 4/012 |
| 2019/0385794 | A1 * | 12/2019 | Yanagisawa | H01G 4/1245 |

FOREIGN PATENT DOCUMENTS

| | | |
|---|---|---|
| JP | 2004228094 | 3/2007 |
| JP | 2016066783 A | 4/2016 |

(56) References Cited

FOREIGN PATENT DOCUMENTS

| TW | 201133525 A | 10/2011 |
|----|-------------|---------|
| TW | 201237899 A | 9/2012  |
| TW | 201633339 A | 9/2016  |

OTHER PUBLICATIONS

Non-Final Office Action issued by U.S. Patent and Trademark Office, dated Jul. 22, 2020, for relevant U.S. Appl. No. 16/417,323 (20 pages).
A Notice of Reasons for Refusal issued by the Japanese Patent Office, dated Oct. 6, 2020, for Japanese related application No. 2016-248519. (3 pages).
A Notification of the Opinion after the Examination with Search Report issued by Taiwan Intellectual Property Office, dated Sep. 15, 2020, for Taiwan related application No. 106143315. (8 pages).
A Notice of Reasons for Refusal issued by the Japanese Patent Office, dated Jan. 26, 2021, for Japanese related application No. 2016-248519. (3 pages).
Final Office Action issued by U.S. Patent and Trademark Office, dated Feb. 12, 2021, for U.S. Appl. No. 16/417,323 (25 pages).
Otitoju et al., Advanced ceramic components: Materials, fabrication, and applications, 2020. Elsevier. Journal of Industrial and Engineering Chemistry 85. 34-65 (32 pages).

\* cited by examiner

MULTILAYER CERAMIC CAPACITOR USING MOLYBDENUM (MO) GROUND LAYER AND MANUFACTURING METHOD OF THE SAME

CROSS-REFERENCE TO RELATED APPLICATION

This application is based upon and claims the benefit of priority of the prior Japanese Patent Application No. 2018-112011, filed on Jun. 12, 2018, the entire contents of which are incorporated herein by reference.

FIELD

A certain aspect of the present invention relates to a multilayer ceramic capacitor and a manufacturing method of the multilayer ceramic capacitor.

BACKGROUND

A multilayer ceramic capacitor has a multilayer structure in which a plurality of dielectric layers and a plurality of internal electrode layers are alternately stacked, and a pair of external electrodes that are formed on a surface of the multilayer structure and are electrically coupled to the internal electrode layers extracted to the surface. The external electrode has a structure in which a ground layer is subjected to a plating. Japanese Patent Application Publication No. H01-80011 discloses that hydrogen generated in the plating is adsorbed in the internal electrode layer and an insulating resistance of the dielectric layer is degraded by reduction caused by the hydrogen. And the patent document discloses that Ni (nickel) is added as a metal for suppressing hydrogen adsorption to the internal electrode of which a main component is a noble metal. On the other hand, Japanese Patent Application Publication No. 2016-66783 discloses the insulating resistance is degraded because of influence of hydrogen even if Ni is used for the internal electrode layer.

SUMMARY OF THE INVENTION

It is demanded that hydrogen intrusion from the external electrode acting as an intrusion path of the hydrogen is suppressed, in order to suppress the influence of hydrogen.

The present invention has a purpose of providing a multilayer ceramic capacitor and a manufacturing method of the multilayer ceramic capacitor that are capable of suppressing hydrogen intrusion from an external electrode.

According to an aspect of the present invention, there is provided a multilayer ceramic capacitor including: a multilayer chip having a parallelepiped shape in which each of a plurality of dielectric layers and each of a plurality of internal electrode layers are alternately stacked and each of the plurality of internal electrode layers is alternately exposed to two end faces of the multilayer chip, a main component of the plurality of dielectric layers being a ceramic; and a pair of external electrodes that are formed on the two end faces; wherein: the pair of external electrodes have a structure in which a plated layer is formed on a ground layer of which a main component is a metal or an alloy including at least one of Ni and Cu; the ground layer includes Mo; and "M≥0.003185×(Ew×Et)$^{-0.5921}$ is satisfied when, in the multilayer chip, "Et" is a height from a bottom one of the internal electrode layers to a top one of the internal electrode layers in a stacking direction, "Ew" is a width of the internal electrode layers in a direction in which side faces of the multilayer chip face with each other, and "M" is a Mo concentration (atm %) with respect to a main component ceramic of a total of the multilayer chip and the pair of external electrodes.

According to another aspect of the present invention, there is provided a manufacturing method of a ceramic multilayer capacitor including: forming a ceramic multilayer structure having a parallelepiped shape in which each of a plurality of ceramic dielectric green sheets and each of a plurality of conductive pastes for forming an internal electrode are alternately stacked and the each of the plurality of conductive pastes is alternately exposed to two end faces of the ceramic multilayer structure; coating a metal paste on the two end faces, the metal paste contacting to the two end faces, the metal paste including metal powder and a Mo source, a main component of the metal powder being a metal or an alloy including at least one of Ni and Cu; forming a multilayer chip from the ceramic multilayer structure and ground layers from the metal paste, by firing the ceramic multilayer structure on which the metal paste is coated; and forming external electrodes, each of which includes each of the ground layers and a plated layer, by performing plating with respect to the ground layers, wherein "M≥0.003185× (Ew×Et)$^{-0.5921}$ is satisfied when, in the multilayer chip, "Et" is a height from a bottom one of the internal electrode layers to a top one of the internal electrode layers in a stacking direction, "Ew" is a width of the internal electrode layers in a direction in which side faces of the multilayer chip face with each other, and "M" is a Mo concentration (atm %) with respect to a main component ceramic of a total of the multilayer chip and the external electrodes.

DETAILED DESCRIPTION

A description will be given of an embodiment with reference to the accompanying drawings.

Embodiment

Figure 1:
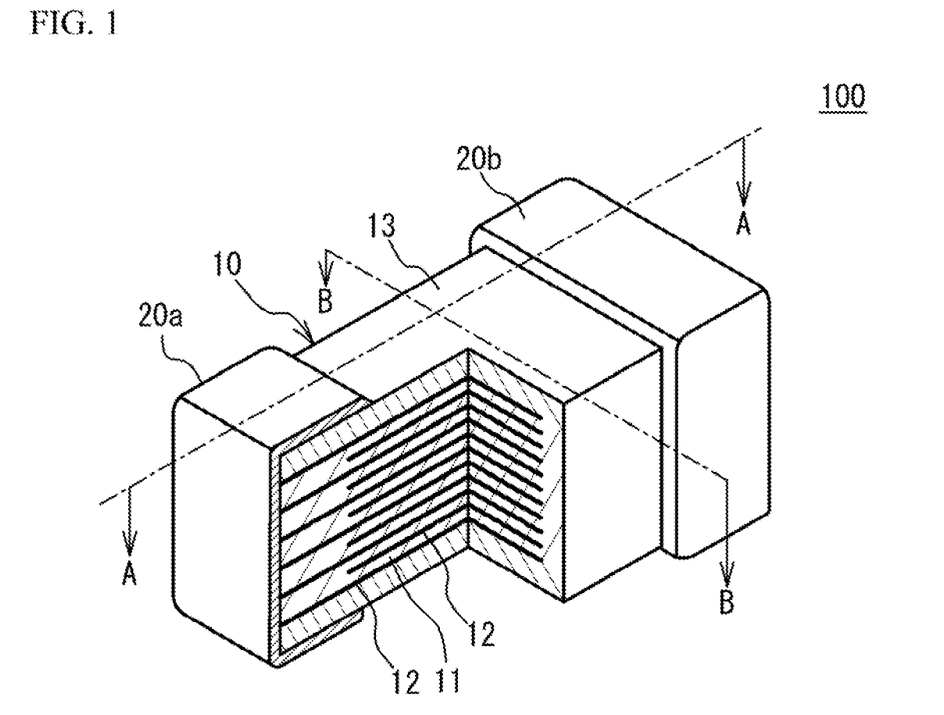
FIG. 1 illustrates a partial perspective view of a multilayer ceramic capacitor.
Figure 2:
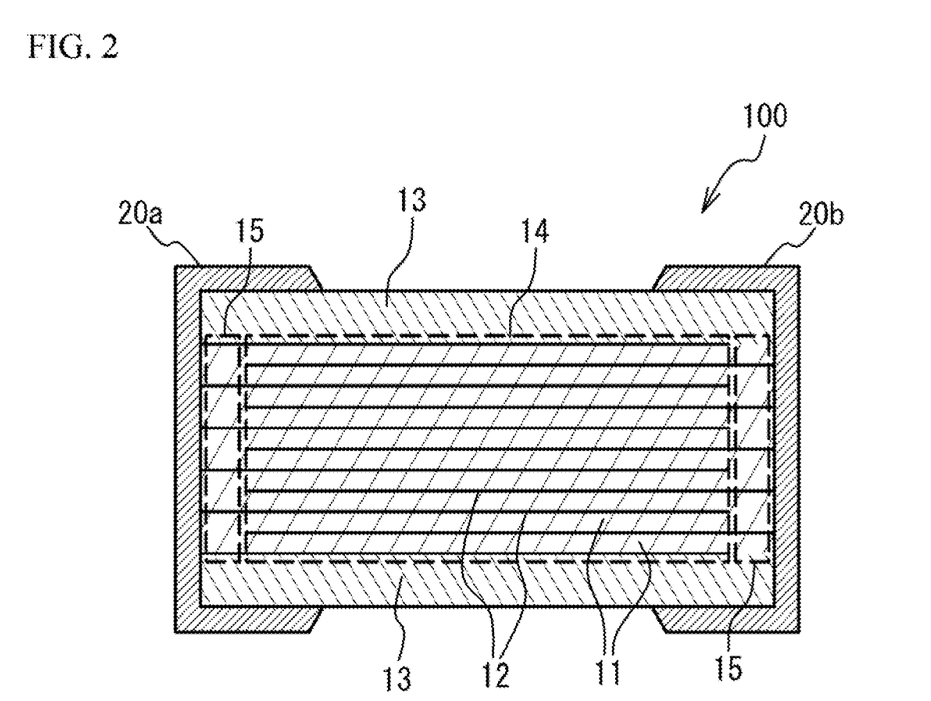
FIG. 2 illustrates a cross sectional view taken along a line A-A of FIG. 1.
Figure 3:
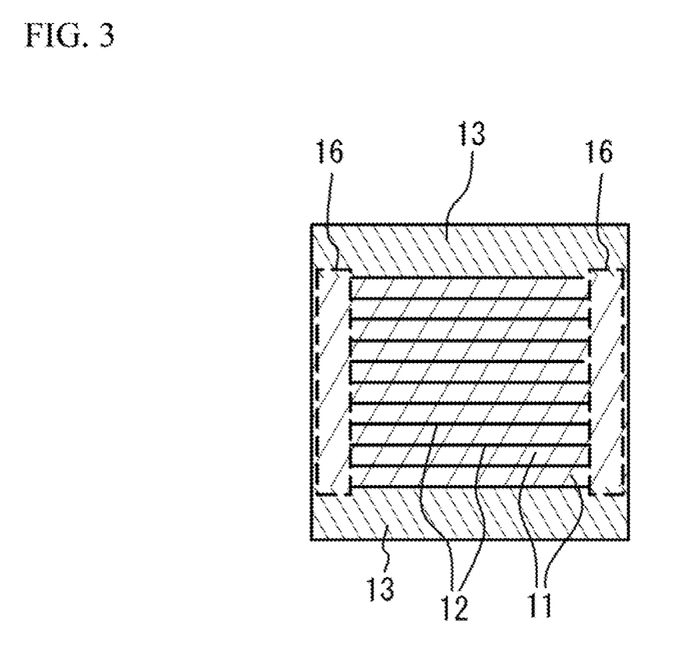
FIG. 3 illustrates a cross sectional view taken along a line B-B of FIG. 1.

FIG. 1 illustrates a partial perspective view of a multilayer ceramic capacitor 100. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. Two faces other than an upper face and a lower face in a stacking direction among four faces other than the two end faces are referred to as side faces. The external electrodes 20a and 20b extend to the upper face, the lower face and the two side faces. However, the external electrodes 20a and 20b are spaced from each other.

The multilayer chip 10 has a structure designed to have dielectric layers 11 and internal electrode layers 12 alternately stacked. The dielectric layer 11 includes a ceramic material acting as a dielectric material. The internal electrode layer 12 includes a base metal. End edges of the internal electrode layers 12 are alternately exposed to a first end face of the multilayer chip 10 and a second end face of the multilayer chip 10 that is different from the first end face. In the embodiment, the first face faces with the second face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer structure of the dielectric layers 11 and the internal electrode layers 12, outermost layers in a stacking direction are two of the internal electrode layers 12. An upper face and a lower face in the stack direction of the multilayer structure are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of noble metal such as platinum (Pt), palladium (Pd), silver (Ag), gold (Au) or alloy thereof. An average thickness of the internal electrode layers 12 is, for example, 1 μm or less. The dielectric layers 11 are mainly composed of a ceramic material having a perovskite structure expressed by a general formula $ABO_3$. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. An average thickness of the dielectric layers 11 is, for example, 1 μm or less.

As illustrated in FIG. 2, a region, in which a set of the internal electrode layers 12 connected to the external electrode 20a face another set of the internal electrode layers 12 connected to the external electrode 20b, is a region generating electrical capacity in the multilayer ceramic capacitor 100. And so, the region is referred to as a capacity region 14. That is, the capacity region 14 is a region in which the internal electrode layers 12 next to each other are connected to different external electrodes face each other.

A region, in which the internal electrode layers 12 connected to the external electrode 20a face with each other without sandwiching the internal electrode layer 12 connected to the external electrode 20b, is referred to as an end margin region 15. A region, in which the internal electrode layers 12 connected to the external electrode 20b face with each other without sandwiching the internal electrode layer 12 connected to the external electrode 20a is another end margin region 15. That is, the end margin region 15 is a region in which a set of the internal electrode layers 12 connected to one external electrode face with each other without sandwiching the internal electrode layer 12 connected to the other external electrode. The end margin region 15 is a region that does not generate electrical capacity in the multilayer ceramic capacitor 100.

As illustrated in FIG. 3, a region of the multilayer chip 10 from the two sides thereof to the internal electrode layers 12 is referred to as a side margin region 16. That is, the side margin region 16 is a region covering edges of the stacked internal electrode layers 12 in the extension direction toward the two side faces. The side margin region 16 does not generate electrical capacity.

Figure 4:
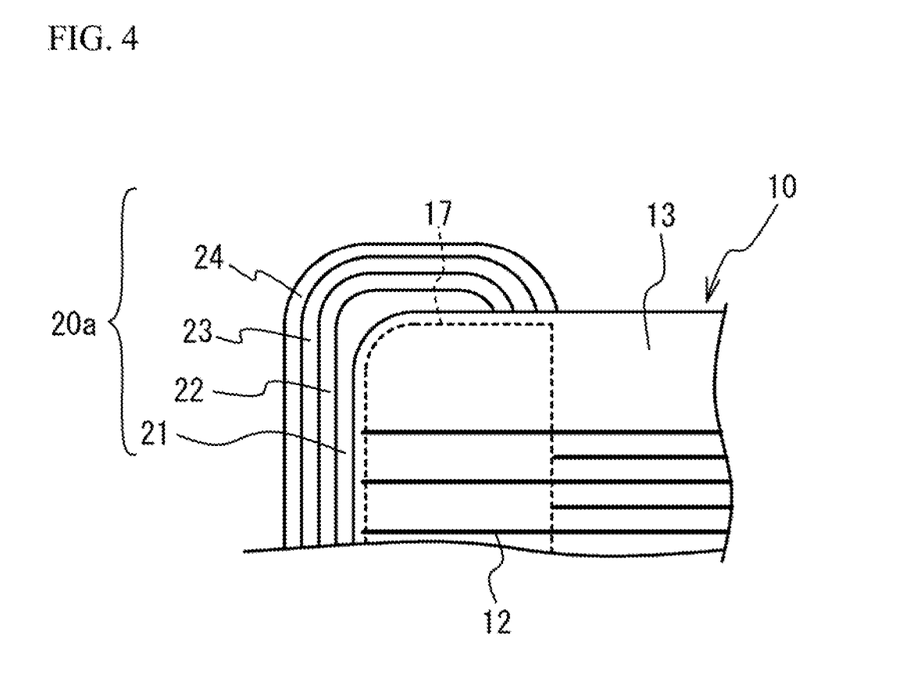
FIG. 4 illustrates a cross sectional view of an external electrode which is a partial cross sectional view taken along a line A-A of FIG. 1.

FIG. 4 illustrates a cross sectional view of the external electrode 20a and is a partial cross sectional view taken along a line A-A of FIG. 1. In FIG. 4, hatching for cross section is omitted. As illustrated in 4, the external electrode 20a has a structure in which a Cu-plated layer 22, a Ni-plated layer 23 and a Sn-plated layer 24 are formed on a ground layer 21 in this order. The ground layer 21, the Cu-plated layer 22, the Ni-plated layer 23 and the Sn-plated layer 24 extend toward the four side faces of the multilayer chip 10 from the both end faces of the multilayer chip 10. In FIG. 4, the external electrode 20a is illustrated. However, the external electrode 20b has the same structure as the external electrode 20a.

A main component of the ground layer 21 is a metal or an alloy including at least one of Ni and Cu. The ground layer 21 may include a glass component for densifying the ground layer 21 or a co-material for controlling sinterability of the ground layer 21. The glass component is an oxide such as Ba, Sr, Ca, Zn (zinc), Al (aluminum), Si (silicon), B (boron) or the like. The co-material is a ceramic component. For example, the co-material is a ceramic component that is a main component of the dielectric layer 11.

The ground layer 21 includes Mo (molybdenum). When the Cu-plated layer 22, the Ni-plated layer 23 and the Sn-plated layer 24 are formed, hydrogen is generated. However, when the ground layer 21 includes Mo, intrusion of the hydrogen into the internal electrode layer 12 is suppressed. For example, Mo has a function of preventing hydrogen permeation. It is thought that an intrusion path of the hydrogen is blocked (blocking effect is achieved), because Mo preventing the hydrogen permeation is provided in the ground layer 21, the Mo diffuses into ceramic regions 17 near the external electrodes 20a and 20b with concentration distribution, and permeability of the hydrogen in the ground layer 21 and the ceramic region 17 is reduced. Each of the ceramic regions 17 is a region of the multilayer chip 10 on each end face side, with respect to facing region in which a set of the internal electrode layers 12 connected to one of the external electrodes and another set of the internal electrode layers 12 connected to the other face with each other. The ceramic region 17 includes a part of the cover layers 13, a whole of the end margin region 15 and a part of the side margin region 16. When the intrusion path of hydrogen is blocked, adsorption of the hydrogen into the internal electrode layer 12 is suppressed and reduction of the dielectric layer 11 is suppressed. Thus, the decrease of the insulating resistance of the multilayer ceramic capacitor 100 is suppressed. In the plating process of the Cu-plated layer 22 and the Ni-plated layer 23, a lot of hydrogen is generated at a surface subjected to the plating. Therefore, it is specifically effective to block the intrusion path of hydrogen.

When a part of Mo in the ground layer 21 diffuses into the dielectric layer 11, the diffused Mo is replaced with the B site of the perovskite structure expressed by $ABO_3$ and acts as a donor. Therefore, generation of an oxygen defect in the ceramic structuring the dielectric layer 11 is suppressed. Accordingly, reduction resistance of the dielectric layer 11 is enhanced. In the embodiment, Mo included in the ground layer 21 is focused on. However, the structure is not limited. Another element that has a function preventing the hydrogen permeation, is replaced with the B site and acts as a donor may be used instead of Mo. The element is such as Nb (niobium), Ta (tantalum), W (tungsten) or the like.

When a main component of the internal electrode layer 12 is Ni, the hydrogen adsorption of the internal electrode layer 12 is enhanced. Therefore, when the main component of the internal electrode layer 12 is Ni, it is specifically effective to suppress the hydrogen intrusion from the external electrodes 20a and 20b. In the plating process of the Cu-plated layer 22 and the Ni-plated layer 23, a lot of hydrogen is generated at the surface subjected to the plating process. Therefore, it is specifically effective to block the intrusion path of hydrogen.

Sn has high compactness. This is because Sn has a closest packing structure. When the Sn-plated layer 24 is formed on the ground layer 21, hydrogen is confined on the multilayer chip 10 side with respect to the Sn-plated layer 24. That is, influence of the hydrogen tends to occur. Therefore, when the Sn-plated layer 24 is formed on the ground layer 21, it is specifically effective to suppress intrusion of hydrogen from the external electrodes 20a and 20b.

Downsizing and capacity enlargement are requested with respect to the multilayer ceramic capacitor 100. And so, the end margin region 15 and the side margin region 16 are designed so as to have a small size. Small size products having a size which is smaller than 1005 size (length: 1.0 mm, width: 0.5 mm, height: 0.5 mm) are being developed based on designs of large size products. Therefore, as shown in Table 1, in each size, the size of the side margin region 16 (length of the multilayer chip 10 in a direction in which side faces face with each other), the size of the end margin region 15 (length of the multilayer chip 10 in a direction in which end faces face with each other), and the width of the internal electrode layer 12 with respect to the size of the multilayer chip 10 (width of the multilayer chip 10 in a direction in which the side faces face with each other) are approximately analogous to each other. The length is 1.0 mm or less, the width is 0.5 mm or less, the height is 0.5 mm or less, and at least one of the conditions that the length is less than 1.0 mm, the width is less than 0.5 mm and the height is less than 0.5 mm is satisfied, when the size is smaller than 1005 size.

TABLE 1

| SIZE (L × W × T) [mm] | DESIGNED VALUE | | |
|---|---|---|---|
| | SIDE MARGIN [µm] | END MARGIN [µm] | WIDTH OF INTERNAL ELECTRODE [mm] |
| 0.25 × 0.125 × 0.125 | 30.6 | 36 | 0.054 |
| 0.4 × 0.2 × 0.2 | 39.6 | 43.2 | 0.1134 |
| 0.6 × 0.3 × 0.3 | 45 | 54 | 0.2367 |

Figure 5:
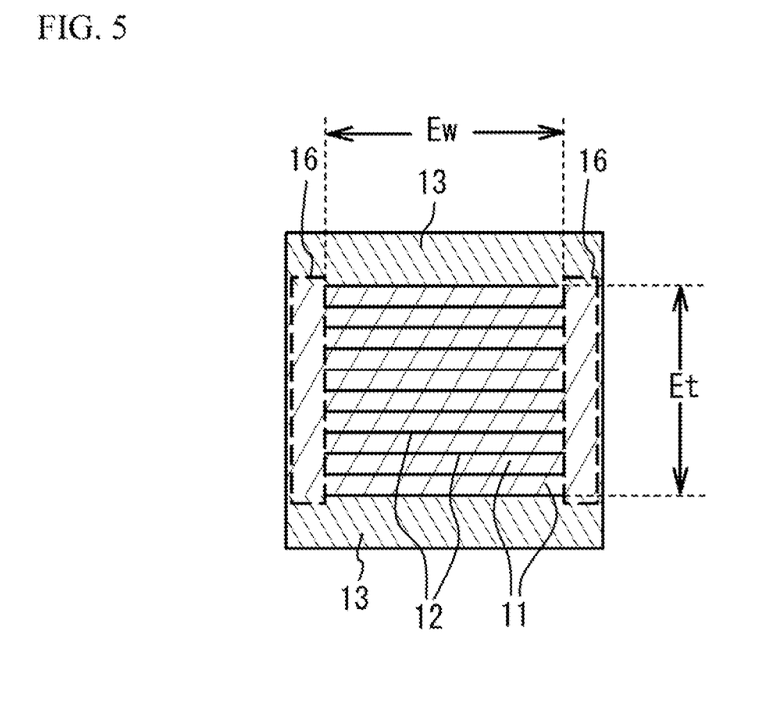
FIG. 5 illustrates Et and Ew.

The present inventors have found that the smaller the size of the multilayer chip 10 is, the larger the amount of $MoO_3$ added to the ground layer 21 is, in a viewpoint of suppression of the intrusion of hydrogen into the multilayer chip 10 from the external electrodes 20a and 20b. In concrete, the present inventors have found that the intrusion of the hydrogen into the multilayer chip 10 from the external electrodes 20a and 20b can be suppressed, when the following formula (1) is satisfied. As illustrated in FIG. 5, in the formula, the height of the capacity region 14 in the stacking direction (height from the bottom one of the internal electrode layers 12 to the top one of the internal electrode layers 12) is expressed by "Et". The width of the internal electrode layer 12 in the direction in which the side faces of the multilayer chip 10 face with each other is expressed by "Ew". The Mo concentration with respect to Ti of the whole of the multilayer ceramic capacitor 100 (atm %) is expressed by "M".

$$M \geq 0.003185 \times (Ew \times Et)^{-0.5921} \quad (1)$$

In the embodiment, the Mo concentration with respect to Ti in the whole of the multilayer ceramic capacitor 100 is focused on, because the Mo concentration of the ground layer 21 is secured and the permeation of the hydrogen through the ground layer 21 is suppressed, or the Mo concentration of the multilayer chip 10 is secured and intrusion of the hydrogen having permeated the external electrodes 20a and 20b into the multilayer chip 10 is suppressed, by controlling the Mo concentration of the whole of the multilayer ceramic capacitor 100.

It is preferable that all of the sizes of the cover layer 13, the end margin region 15 and the side margin region 16 are considered. However, the present inventors have found that the Mo concentration can be simply calculated with use of Ew×Et. Therefore, in the above-mentioned formula (1), Ew×Et is calculated.

In the small size products, absolute amounts of the cover layer 13, the end margin region 15 and the side margin region 16 are small. Therefore, the smaller the size is, the larger the effect achieved by the formula (1) is. In concrete, with respect to the small size product which is smaller than 1005 size (length: 1.0 mm, width: 0.5 mm, height: 0.5 mm), the effect of the embodiment is large. For example, the effect of the embodiment is large, when the thickness of the cover layer 13, the width of the end margin region 15 in the direction in which the end faces of the multilayer chip 10 face with each other, and the width of the side margin region 16 in the direction in which the side faces of the multilayer chip 10 face with each other are less than 50 µm.

Figure 6:
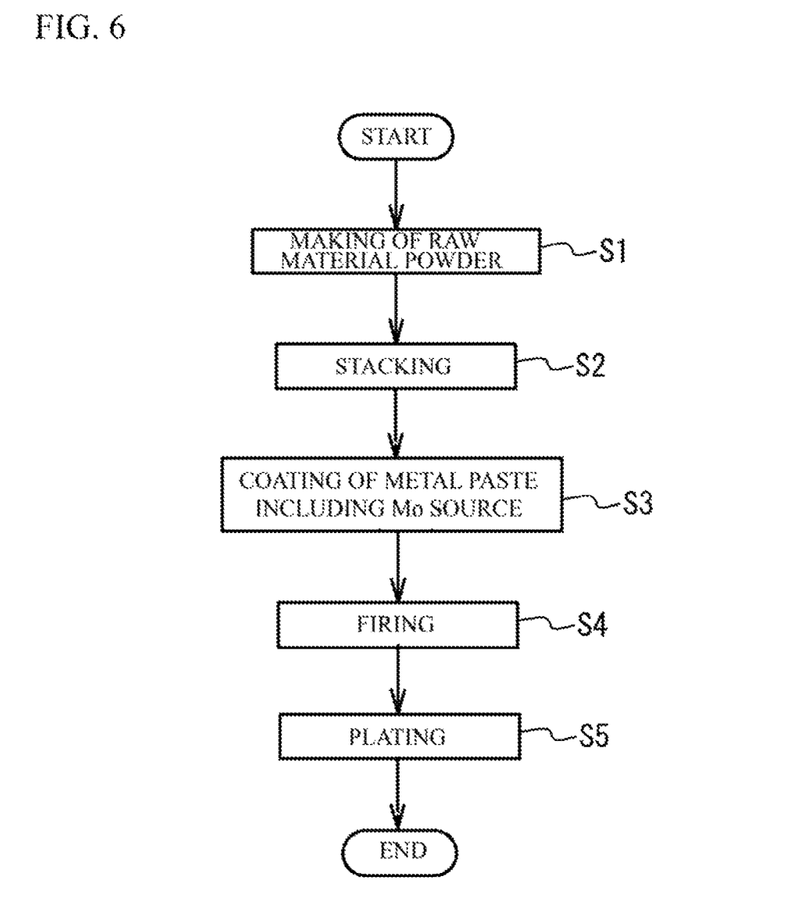
FIG. 6 illustrates a manufacturing method of a multilayer ceramic capacitor.

Next, a description will be given of a manufacturing method of the multilayer ceramic capacitor 100. FIG. 6 illustrates a manufacturing method of the multilayer ceramic capacitor 100.

[Making Process of Raw Material Powder]

Additive compound may be added to ceramic material powder that is a main component of the dielectric layer 11, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium), or an oxide of Co (cobalt), Ni, Li (lithium), B, Na (sodium), K (potassium) and Si, or glass. For example, compound including additive compound is added to ceramic material powder and is calcined. Next, the resulting ceramic material grains are wet-blended with additive compound, is dried and is crushed. Thus, the ceramic material powder is adjusted.

[Stacking Process]

Next, a binder such as polyvinyl butyral (PVB) resin, an organic solvent such as ethanol or toluene, and a plasticizer are added to the resulting ceramic material powder and wet-blended. With use of the resulting slurry, a strip-shaped dielectric green sheet with a thickness of 0.8 µm or less is coated on a base material by, for example, a die coater method or a doctor blade method, and then dried.

Then, a pattern of the internal electrode layer 12 is provided on the surface of the dielectric green sheet by printing a conductive paste for forming the internal electrode with use of screen printing or gravure printing. The conductive paste includes powder of the main component metal of the internal electrode layer 12, a binder, a solvent, and additives as needed. It is preferable that the binder and the solvent are different from those of the above-mentioned ceramic slurry. As a co-material, the ceramic material that is the main component of the dielectric layer 11 may be distributed in the conductive paste.

Then, the dielectric green sheet on which the internal electrode layer pattern is printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to a pair of external electrodes of different polarizations. Cover sheets, which are to be the cover layers 13, are compressed on the stacked green sheets and under the stacked sheets. The resulting compact is cut into a predetermined size (for example, 1.0 mm×0.5 mm). Thus, a ceramic multilayer structure having a rectangular parallelepiped shape is obtained.

[Coating Process of a Metal Paste]

Next, the binder is removed from the ceramic multilayer structure made in the stacking process in $N_2$ atmosphere in a temperature range of 200 degrees C. to 500 degrees C. After that, metal paste including a metal filler, the co-material, the binder, the solvent and a Mo source is coated from the both end faces of the ceramic multilayer structure to each side face and is dried. The metal paste is used for forming the external electrodes.

A type, a shape or the like of the Mo source is not limited. For example, in concrete, molybdenum oxide ($MoO_2$, $MoO_3$), molybdenum chloride ($MoCl_2$, $MoCl_3$, $MoCl_4$), molybdenum hydroxide ($Mo(OH)_3$, $Mo(OH)_5$), barium molybdate ($BaMoO_4$), ammonium molybdate (($NH_4)_6$ $Mo_7O_{24}.4H_2O$), molybdenum-nickel alloy, or the like may be used as the Mo source. A co-material in which Mo is dissolved in advance may be used as the Mo source.

[Firing Process]

Next, the resulting ceramic multilayer structure on which the metal paste for forming the external electrode is fired for ten minutes to 2 hours in a reductive atmosphere in a temperature range of 1100 degrees C. to 1300 degrees C. In this manner, a sintered structure having the multilayer chip 10 having the multilayer structure in which the sintered dielectric layers 11 and the sintered internal electrode layers 12 are alternately stacked and having the cover layers 13 formed as outermost layers of the multilayer chip 10 in the stack direction and the ground layer 21 is obtained.

[Plating Process]

After that, a plating process is performed. Thereby, the Cu-plated layer 22, the Ni-plated layer 23 and the Sn-plated layer 24 are formed on the ground layer 21 in this order. With the processes, the multilayer ceramic capacitor 100 is fabricated.

With the manufacturing method in accordance with the embodiment, the ground layer 21 includes Mo. In this case, when hydrogen is generated in the formation process of the Cu-plated layer 22, the Ni-plated layer 23 and the Sn-plated layer 24, the intrusion of the hydrogen into the internal electrode layer 12 is suppressed. Thus, the adsorption of the hydrogen in the internal electrode layer 12 is suppressed, and the reduction of the dielectric layer 11 is suppressed. Therefore, reduction of the insulating resistance is suppressed. And, when a part of Mo of the ground layer 21 diffuses into the dielectric layer 11, the diffused Mo is replaced with the B site of the perovskite expressed by $ABO_3$ and acts as a donor element. Thus, the generation of the oxygen defect of the ceramic structuring the dielectric layer 11 is suppressed. Accordingly, the reduction resistance of the dielectric layer 11 is enhanced.

The same effect may be achieved, when the Mo source is not added to the metal paste before forming the external electrode and a film of the Mo source is formed with a sputtering before coating the metal paste, or after coating the metal paste, or both before and after coating the metal paste.

In the embodiment, the Mo source is added so that the above-mentioned formula (1) is satisfied when the height of the capacity region 14 in the stacking direction is expressed by "Et", the width of the internal electrode layer 12 in the direction in which the side faces of the multilayer chip 10 face with each other is expressed by "Ew", and the Mo concentration with respect to Ti of the whole of the multilayer ceramic capacitor 100 (atm %) is expressed by "M". Therefore, the intrusion of the hydrogen into the multilayer chip 10 from the external electrodes 20a and 20b is suppressed.

EXAMPLE

The multilayer ceramic capacitors in accordance with the embodiment were made and the property was measured.

Examples 1 to 3 and Comparative Examples 1 and 2

Additive compound was added to barium titanate powder. The resulting barium titanate powder was sufficiently wet blended and was crushed by a ball mill. Thus, the dielectric material was obtained. An organic binder and a solvent were added to the dielectric material. And dielectric green sheets were made by a doctor blade method. A thickness of the dielectric green sheet was 1.2 µm. The organic binder was polyvinyl butyral (PVB) resin or the like. The solvent was ethanol, toluene or the like. And a plasticizer and so on were added. Next, the conductive paste for forming the internal electrode layer was made by mixing powder acting as a main component metal of the internal electrode layer 12, a binder, a solvent and an additive as needed. The organic binder and the solvent were different from those of the dielectric green sheet. The conductive paste was screen-printed on the dielectric green sheet. 50 of the dielectric green sheets on which the conductive paste for forming the internal electrode layer was printed were stacked, and cover sheets were stacked on the stacked dielectric green sheets and under the stacked dielectric green sheets. After that, a ceramic multilayer structure was obtained by a thermal compressing. And the ceramic multilayer structure was cut into a predetermined size.

The binder was removed from the ceramic multilayer structure in $N_2$ atmosphere. After that, metal paste including a metal filler of which a main component is Ni, a co-material, a binder, solvent and a Mo source was coated from the both end faces of the ceramic multilayer structure to each side face and was dried. $MoO_3$ was used as the Mo source. In the example 1, the concentration of Mo with respect to the whole Ti was 0.10 atm %. In the example 2, the concentration of Mo with respect to the whole Ti was 0.12 atm %. In the example 3, the concentration of Mo with respect to the whole Ti was 0.14 atm %. In the comparative example 1, the concentration of Mo with respect to the whole Ti was 0.06 atm %. In the comparative example 2, the concentration of Mo with respect to the whole Ti was 0.08 atm %. After that, the metal paste was fired together with the ceramic multilayer structure for 10 minutes to two hours in a reductive atmosphere within a temperature range of 1100 degrees C. to 1300 degrees C., and a sintered structure was formed.

The length, the width and the height of the sintered structure were respectively 0.25 mm, 0.125 mm and 0.125 mm. The sintered structure was re-oxidized in $N_2$ atmosphere at 800 degrees C. After that, the Cu-plated layer 22, the Ni-plated layer 23 and the Sn-plated layer 24 were formed on the surface of the ground layer 21 by plating. And the multilayer ceramic capacitor 100 was fabricated. 1000 samples of each of the examples 1 to 3 and the comparative examples 1 and 2 were made.

Examples 4 to 6 and Comparative Examples 3 and 4

Additive compound was added to barium titanate powder. The resulting barium titanate powder was sufficiently wet blended and was crushed by a ball mil. Thus, the dielectric material was obtained. An organic binder and a solvent were added to the dielectric material. And dielectric green sheets were made by a doctor blade method. A thickness of the dielectric green sheet was 1.2 µm. The organic binder was polyvinyl butyral (PVB) resin or the like. The solvent was ethanol, toluene or the like. And a plasticizer and so on were added. Next, the conductive paste for forming the internal electrode layer was made by mixing metal powder acting as a main component metal of the internal electrode layer 12, a binder, a solvent and an additive as needed. The organic binder and the solvent were different from those of the dielectric green sheet. The conductive paste was screen-printed on the dielectric green sheet. 90 of the dielectric green sheets on which the conductive paste for forming the internal electrode layer was printed were stacked, and cover sheets were stacked on the stacked dielectric green sheets and under the stacked dielectric green sheets. After that, a ceramic multilayer structure was obtained by a thermal compressing. And the ceramic multilayer structure was cut into a predetermined size.

The binder was removed from the ceramic multilayer structure in $N_2$ atmosphere. After that, metal paste including a metal filler of which a main component is Ni, a co-material, a binder, solvent and a Mo source was coated from the both end faces of the ceramic multilayer structure to each side face and was dried. $MoO_3$ was used as the Mo source. In the example 4, the concentration of Mo with respect to the whole Ti was 0.06 atm %. In the example 5, the concentration of Mo with respect to the whole Ti was 0.08 atm %. In the example 6, the concentration of Mo with respect to the whole Ti was 0.10 atm %. In the comparative example 3, the concentration of Mo with respect to the whole Ti was 0.02 atm %. In the comparative example 4, the concentration of Mo with respect to the whole Ti was 0.04 atm %. After that, the metal paste was fired together with the ceramic multilayer structure for 10 minutes to two hours in a reductive atmosphere within a temperature range of 1100 degrees C. to 1300 degrees C., and a sintered structure was formed.

The length, the width and the height of the sintered structure were respectively 0.4 mm, 0.2 mm and 0.2 mm. The sintered structure was re-oxidized in $N_2$ atmosphere at 800 degrees C. After that, the Cu-plated layer 22, the Ni-plated layer 23 and the Sn-plated layer 24 were formed on the surface of the ground layer 21 by plating. And the multilayer ceramic capacitor 100 was fabricated. 1000 samples of each of the examples 4 to 6 and the comparative examples 3 and 4 were made.

Examples 7 to 10 and Comparative Example 5

Additive compound was added to barium titanate powder. The resulting barium titanate powder was sufficiently wet blended and was crushed by a ball mill. Thus, the dielectric material was obtained. An organic binder and a solvent were added to the dielectric material. And dielectric green sheets were made by a doctor blade method. A thickness of the dielectric green sheet was 1.2 µm. The organic binder was polyvinyl butyral (PVB) resin or the like. The solvent was ethanol, toluene or the like. And a plasticizer and so on were added. Next, the conductive paste for forming the internal electrode layer was made by mixing powder acting as a main component metal of the internal electrode layer 12, a binder, a solvent and an additive as needed. The organic binder and the solvent were different from those of the dielectric green sheet. The conductive paste was screen-printed on the dielectric green sheet. 200 of the dielectric green sheets on which the conductive paste for forming the internal electrode layer was printed were stacked, and cover sheets were stacked on the stacked dielectric green sheets and under the stacked dielectric green sheets. After that, a ceramic multilayer structure was obtained by a thermal compressing. And the ceramic multilayer structure was cut into a predetermined size.

The binder was removed from the ceramic multilayer structure in $N_2$ atmosphere. After that, metal paste including a metal filler of which a main component is Ni, a co-material, a binder, solvent and a Mo source was coated from the both end faces of the ceramic multilayer structure to each side face and was dried. $MoO_3$ was used as the Mo source. In the example 7, the concentration of Mo with respect to the whole Ti was 0.02 atm %. In the example 8, the concentration of Mo with respect to the whole Ti was 0.04 atm %. In the example 9, the concentration of Mo with respect to the whole Ti was 0.06 atm %. In the example 10, the concentration of Mo with respect to the whole Ti was 0.08 atm %. In the comparative example 5, the concentration of Mo with respect to the whole Ti was 0.01 atm %. After that, the metal paste was fired together with the ceramic multilayer structure for 10 minutes to two hours in a reductive atmosphere within a temperature range of 1100 degrees C. to 1300 degrees C., and a sintered structure was formed.

The length, the width and the height of the sintered structure were respectively 0.6 mm, 0.3 mm and 0.3 mm. The sintered structure was re-oxidized in $N_2$ atmosphere at 800 degrees C. After that, the Cu-plated layer 22, the Ni-plated layer 23 and the Sn-plated layer 24 were formed on the surface of the ground layer 21 by plating. And the multilayer ceramic capacitor 100 was fabricated. 1000 samples of each of the examples 7 to 10 and the comparative example 5 were made.

Figure 7:
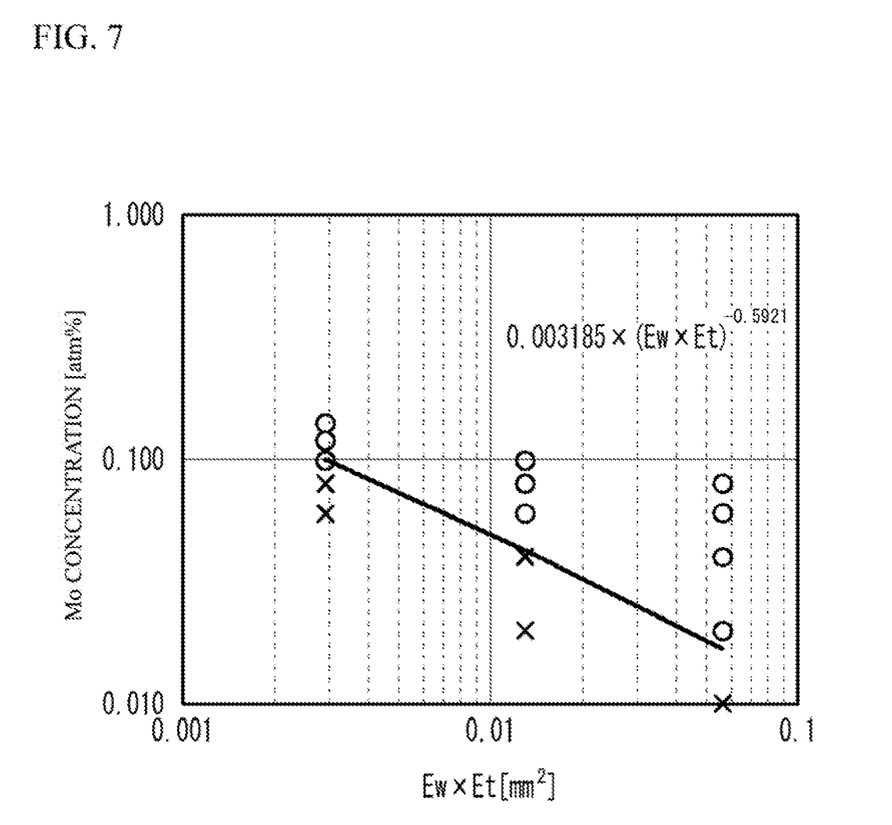
FIG. 7 illustrates a graph of evaluation based on a formula.

A withstand test was performed with respect to the examples 1 to 10 and the comparative examples 1 to 5. In the withstand test, a temperature was 85 degrees C., a relative humidity was 85%, an applied voltage was 10V, and a time was 100 h. In this case, an incidence rate (IR defect incidence rate) of samples of which resistance was 100 MΩ or less for 60 seconds was measured. Table 2 shows the results. In table 2, "M" indicates a lower limit value of the Mo concentration for satisfying the above-mentioned formula (1). When the formula (1) is satisfied, "evaluation based on formula" is determined as good "◯". When the formula (1) is not satisfied, "evaluation based on formula" is determined as bad "X". FIG. 8 illustrates a graph of "evaluation based on formula".

TABLE 2

|  | SIZE (L × W × T) [mm] | Ew × Et [mm$^2$] | M | EVALUATION BASED ON FORMULA | Mo CONCENTRATION [atm %] | NUMBER OF IR DEFECT | EVALUATION |
|---|---|---|---|---|---|---|---|
| COMPARATIVE EXAMPLE 1 | 0.25 × 0.125 × 0.125 | 0.0029 | 0.100 | X | 0.06 | 12/1000 | X |
| COMPARATIVE EXAMPLE 2 | | | | X | 0.08 | 5/1000 | X |
| EXAMPLE 1 | | | | ◯ | 0.10 | 0/1000 | ◯ |
| EXAMPLE 2 | | | | ◯ | 0.12 | 0/1000 | ◯ |
| EXAMPLE 3 | | | | ◯ | 0.14 | 0/1000 | ◯ |
| COMPARATIVE EXAMPLE 3 | 0.4 × 0.2 × 0.2 | 0.0128 | 0.043 | X | 0.02 | 5/1000 | X |
| COMPARATIVE EXAMPLE 4 | | | | X | 0.04 | 2/1000 | X |
| EXAMPLE 4 | | | | ◯ | 0.06 | 0/1000 | ◯ |
| EXAMPLE 5 | | | | ◯ | 0.08 | 0/1000 | ◯ |
| EXAMPLE 6 | | | | ◯ | 0.10 | 0/1000 | ◯ |
| COMPARATIVE EXAMPLE 5 | 0.6 × 0.3 × 0.3 | 0.0562 | 0.017 | X | 0.01 | 1/1000 | X |
| EXAMPLE 7 | | | | ◯ | 0.02 | 0/1000 | ◯ |
| EXAMPLE 8 | | | | ◯ | 0.04 | 0/1000 | ◯ |
| EXAMPLE 9 | | | | ◯ | 0.06 | 0/1000 | ◯ |
| EXAMPLE 10 | | | | ◯ | 0.08 | 0/1000 | ◯ |

As shown in Table 2, in the examples 1 to 10, the IR defect incidence rate was 0%. It is thought that this was because the intrusion of hydrogen into the multilayer chip 10 from the external electrodes 20a and 20b was suppressed because the formula (1) was satisfied. On the other hand, in the comparative examples 1 to 5, the IR defect incidence rate was more than 0%. It is thought that this was because the intrusion of hydrogen into the multilayer chip 10 from the external electrodes 20a and 20b was not sufficiently suppressed, because the formula (1) was not satisfied.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
a multilayer chip having a parallelepiped shape in which each of a plurality of dielectric layers and each of a plurality of internal electrode layers are alternately stacked and the each of the plurality of internal electrode layers is alternately exposed to two end faces of the multilayer chip, a main component of the plurality of dielectric layers being a ceramic; and
a pair of external electrodes that are formed on the two end faces;
wherein:
the pair of external electrodes have a structure in which a plated layer is formed on a ground layer of which a main component is a metal or an alloy including at least one of Ni and Cu;
the ground layer includes Mo in a manner that:
M≥0.003185×(Ew (mm)×Et (mm))$^{-0.5921}$ is satisfied when, in the multilayer chip, "Et" is a height from a bottom one of the internal electrode layers to a top one of the internal electrode layers in a stacking direction, "Ew" is a width of the internal electrode layers in a direction in which side faces of the multilayer chip face each other, and "M" is a Mo concentration (atm %) with respect to a main ceramic component of a total of the multilayer chip and the pair of external electrodes.

2. The multilayer ceramic capacitor as claimed in claim 1, wherein the multilayer ceramic capacitor has a size smaller than a size of a length of 1.0 mm, a width of 0.5 mm and a height of 0.5 mm.

3. The multilayer ceramic capacitor as claimed in claim 1, wherein the plated layer includes a Sn-plated layer.

4. The multilayer ceramic capacitor as claimed in claim 1, wherein a main component metal of the ground layer is Ni.

5. The multilayer ceramic capacitor as claimed in claim 1, wherein a main component of the internal electrode layer is Ni.

6. A manufacturing method of a multilayer ceramic capacitor comprising:
forming a ceramic multilayer structure having a parallelepiped shape in which each of a plurality of ceramic dielectric green sheets and each of a plurality of conductive pastes for forming an internal electrode are alternately stacked and the each of the plurality of conductive pastes is alternately exposed to two end faces of the ceramic multilayer structure;

coating a metal paste on the two end faces, the metal paste contacting to the two end faces, the metal paste including metal powder and a Mo source, a main component of the metal powder being a metal or an alloy including at least one of Ni and Cu;

forming a multilayer chip from the ceramic multilayer structure and ground layers from the metal paste, by firing the ceramic multilayer structure on which the metal paste is coated; and forming external electrodes, each of which includes each of the ground layers and a plated layer, by performing plating with respect to the ground layers, wherein the Mo source is included in the metal paste in a manner that $M \geq 0.003185 \times (Ew\ (mm) \times Et\ (mm))^{-0.5921}$ is satisfied when, in the multilayer chip, "Et" is a height from a bottom one of the internal electrode layers to a top one of the internal electrode layers in a stacking direction, "Ew" is a width of the internal electrode layers in a direction in which side faces of the multilayer chip face each other, and "M" is a Mo concentration (atm %) with respect to a main ceramic component of a total of the multilayer chip and the external electrodes.

7. The multilayer ceramic capacitor as claimed in claim 1, wherein the ground layer includes Mo oxide.

8. The method as claimed in claim 6, wherein the Mo source is Mo oxide.

9. The multilayer ceramic capacitor as claimed in claim 1,
wherein the multilayer chip has a first cover layer of which a main component is a ceramic material from the top one of the internal electrode layers to a top surface of the multilayer chip and a second cover layer from the bottom one of the internal electrode layers to a bottom surface of the multilayer chip,
wherein each of a thickness of the first cover layer and a thickness of the second cover layer is 50 μm or less.

10. The multilayer ceramic capacitor as claimed in claim 1, wherein the multilayer chip has a first end margin region in which internal electrode layers coupled to a first end face of the two end faces face each other without sandwiching internal electrode layers coupled to a second end face of the two end faces and a second end margin region in which the internal electrode layers coupled to the second end face of the two end faces face each other with out sandwiching the internal electrode layers coupled to the first end face of the two end faces; and wherein each of a width of the first end margin region and a width of the second end margin region in a facing direction between the first end face and the second end face is 50 um or less.

11. The multilayer ceramic capacitor as claimed in claim 1,
wherein the multilayer chip has side margin regions that cover edge portions to which the plurality of internal electrode layers extend toward two side faces other than the first end face and the second end face,
wherein each width of the side margin regions in a facing direction between the two side faces is 50 μm or less.

12. The multilayer ceramic capacitor as claimed in claim 2,
wherein the multilayer chip has a first cover layer of which a main component is a ceramic material from the top one of the internal electrode layers to a top surface of the multilayer chip and a second cover layer from the bottom one of the internal electrode layers to a bottom surface of the multilayer chip,
wherein each of a thickness of the first cover layer and a thickness of the second cover layer is 50 μm or less.

13. The multilayer ceramic capacitor as claimed in claim 2, wherein the multilayer chip has a first end margin region in which internal electrode layers coupled to a first end face of the two end faces face each other without sandwiching internal electrode layers coupled to a second end face of the two end faces and a second end margin region in which the internal electrode layers coupled to the second end face of the two end faces face each other without sandwiching the internal electrode layers coupled to the first end face of the two end faces; and wherein each of a width of the first end margin region and a width of the second end margin region in a facing direction between the first end face and the second end face is 50 um or less.

14. The multilayer ceramic capacitor as claimed in claim 2,
wherein the multilayer chip has side margin regions that cover edge portions to which the plurality of internal electrode layers extend toward two side faces other than the first end face and the second end face,
wherein each width of the side margin regions in a facing direction between the two side faces is 50 μm or less.

15. The method as claimed in claim 6,
wherein the multilayer chip has a first cover layer of which a main component is a ceramic material from the top one of the internal electrode layers to a top surface of the multilayer chip and a second cover layer from the bottom one of the internal electrode layers to a bottom surface of the multilayer chip,
wherein each of a thickness of the first cover layer and a thickness of the second cover layer is 50 μm or less.

16. The multilayer ceramic capacitor as claimed in claim 6, wherein the multilayer chip has a first end margin region in which internal electrode layers coupled to a first end face of the two end faces face each other without sandwiching internal electrode layers coupled to a second end face of the two end faces and a second end margin region in which the internal electrode layers coupled to the second end face of the two end faces face each other without sandwiching the internal electrode layers coupled to the first end face of the two end faces; and wherein each of a width of the first end margin region and a width of the second end margin region in a facing direction between the first end face and the second end face is 50 um or less.

17. The multilayer ceramic capacitor as claimed in claim 6,
wherein the multilayer chip has side margin regions that cover edge portions to which the plurality of internal electrode layers extend toward two side faces other than the first end face and the second end face,
wherein each width of the side margin regions in a facing direction between the two side faces is 50 μm or less.

* * * * *